UNITED STATES PATENT OFFICE.

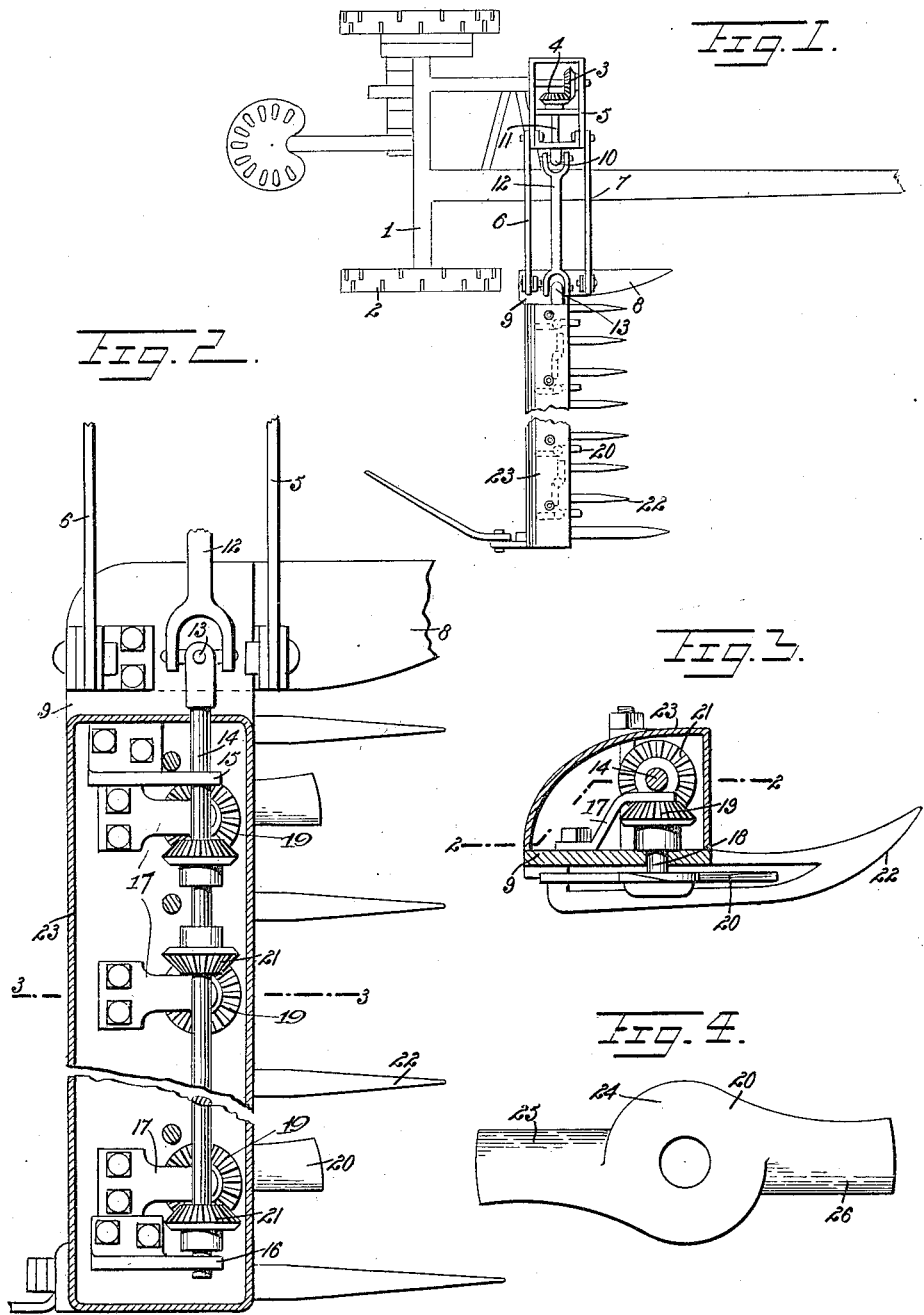

CHARLES A. JOHNSON, OF SACRAMENTO, CALIFORNIA.

FINGER-BAR FOR MOWERS.

1,219,322.

Specification of Letters Patent. Patented Mar. 13, 1917.

Application filed April 11, 1916. Serial No. 90,338.

*To all whom it may concern:*

Be it known that I, CHARLES A. JOHNSON, a citizen of the United States, and a resident of Sacramento, in the county of Sacramento and State of California, have invented a new and Improved Finger-Bar for Mowers, of which the following is a full, clear, and exact description.

This invention relates to mowing machines and particularly to a finger bar for a mowing machine, and has for an object the provision of an improved arrangement of cutting members which correctly strike the grass or vegetable matter to be cut and without in any way interfering with the remaining parts of the device.

Another object in view is to provide a finger bar in which the alternate cutters rotate in a different direction, the position of rotation of these cutters being such that one cutter will overlap the other cutter during the cycle of rotation though never coming in contact.

A still further object in view is to provide a finger bar with revolving blades and a hinge connection between the same and the remaining part of a mowing machine so that rotary movement may be transmitted and the cutting bar raised and lowered as desired for varying the height of cut.

In the accompanying drawings:

Figure 1 is a top plan view of a mowing machine with a finger bar and associated parts embodying the invention.

Fig. 2 is a section through Fig. 3 on line 2—2.

Fig. 3 is a transverse section through Fig. 2 on line 3—3.

Fig. 4 is a top plan view of one of the cutting blades, the same being shown on an enlarged scale.

Referring to the accompanying drawing by numerals, 1 indicates the frame or body of the mowing machine which may be of any desired kind and which is provided with traction wheels 2 by which motion is transmitted to the beveled gear 3, said beveled gear meshing with a second beveled gear 4 supported by a frame 5. The frame 5 is pivotally connected with the bracing rods 6 and 7 connected to the shoe 8 of the finger bar 9. A universal joint 10 connects the shaft 11, which is secured to beveled gear 4, with the tumbler rod 12, said tumbler rod being connected at 13 to a shaft 14 running longitudinally of the finger bar 9, as shown in Fig. 2. The pivotal connection of the finger bar 9 to the rods 6 and 7 permits the finger bar to be raised and lowered as desired for cutting at different heights without affecting the driving mechanism.

Arranged on the finger bar 9 are brackets 15 and 16 which support the rod or shaft 14 and also a plurality of brackets 17 which receive the ends of the shafts 18. The shafts 18 extend through the various beveled gears 19 and also are connected to the respective cutting blades 20, as shown in Fig. 3. It will be observed that the respective beveled gears 19 are provided with hubs that act as bearing members for supporting the shafts 18. As shown more particularly in Fig. 2, the various beveled gears 19 mesh with beveled gears 21 on shaft 14 but the beveled gears 21 are so arranged that the alternate cutters 20 move in opposite directions. By providing this arrangement part of the various blades may have their cycle of movement overlap and yet operate in the same plane without contact. When the parts are in the position shown in dotted lines in Fig. 1 it will be seen that the blades extending longitudinally of the finger bar 9 will almost contact with the pivotal or central part of the adjacent cutting members 20, but as all these members move in unison they move properly in cycles and in the same plane without contact. For instance, as the last cutting member shown in Fig. 1 moves so as to be in line with the finger bar 9 the next adjacent cutting member will move transversely. This is carried on throughout the entire system of cutting members or knives.

The various cutters or knives 20 are preferably arranged between the fingers or guards 22 and operate in these guards in the usual manner. A quadrant shaped hood or casing 23 is secured in place by any suitable means, as for instance, bolts, and preferably rests on the finger bar 9 so that the various moving parts are protected and liability of grass and other foreign substances being drawn in by the knives to the said moving parts is prevented. By means of the casing the person operating the device is also protected against accidentally engaging any of the moving parts. As shown in Fig. 4, each of the cutters or blades 20 is provided with a central portion 24 and oppositely facing cutting edges 25 and 26, these edges cutting alternately as the knife rotates.

It will be seen that the finger bar extends rearwardly beyond the cutting knives so as to protect the rear portion of the knives and thereby prevent the grass falling over the hood from becoming entangled in the knives. By extending the finger bar beyond the knives, also serves to prevent any one from coming in contact with the rear portion of the knives and being injured thereby.

What I claim is:—

1. In a mower, a finger bar, a plurality of rotary cutting knives separately mounted on different axes on the under side of the finger bar, a driving mechanism for the knives mounted on the upper side of the finger bar, the finger bar extending rearwardly of the rotary cutting knives, and a quadrant-shaped hood open at its bottom only and secured upon the upper face of the finger bar with its lower edges resting thereon, whereby the rear portion of the cutting knives are protected, the driving mechanism is wholly inclosed and liability of grass and other foreign substances being drawn in by the knives to the said driving mechanism, is prevented.

2. In a mower, a finger bar, end and intermediate brackets on the upper face of the finger bar, a horizontal revoluble shaft mounted in the end brackets of the finger bar, gear wheels on the said shaft, a plurality of vertical shafts having their upper ends mounted in the intermediate brackets of the finger bar, and their lower ends extending through the said finger bar, a gear wheel secured to the upper end of each vertical shaft and meshing with a gear wheel of the horizontal shaft, the gear wheels of the vertical shafts having hubs resting upon the upper face of the finger bar, and serving as bearing members for supporting said shafts, and a knife secured upon each vertical shaft below the finger bar, said finger bar extending rearwardly of the rotating cutting knives.

In testimony whereof I have signed my name to this specification in the presence of two subscribing witnesses.

CHARLES A. JOHNSON.

Witnesses:
CHARLES H. SLANSON,
EDWARD A. KEEHNER.

Copies of this patent may be obtained for five cents each, by addressing the "Commissioner of Patents, Washington, D. C."